US007508768B2

(12) United States Patent
Yoon et al.

(10) Patent No.: US 7,508,768 B2
(45) Date of Patent: Mar. 24, 2009

(54) TRAFFIC MEASUREMENT SYSTEM AND TRAFFIC ANALYSIS METHOD THEREOF

(75) Inventors: Seung Hyun Yoon, Daejeon (KR); Tae Soo Jeong, Daejeon (KR); Tae Sang Choi, Daejeon (KR); Hyung Hwan Kim, Daejeon (KR); Hyung Seok Chung, Daejeon (KR); Jeong Sook Park, Daejeon (KR); Chang Hoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 814 days.

(21) Appl. No.: 10/693,416

(22) Filed: Oct. 23, 2003

(65) Prior Publication Data
US 2005/0249125 A1 Nov. 10, 2005

(30) Foreign Application Priority Data
Dec. 13, 2002 (KR) .................. 10-2002-0079733

(51) Int. Cl.
*H04L 12/26* (2006.01)
*H04J 1/16* (2006.01)
*G06F 13/00* (2006.01)

(52) U.S. Cl. .................. 370/252; 370/224; 370/229; 370/241; 370/392; 370/401; 709/223; 709/224; 709/229

(58) Field of Classification Search ......... 370/229–241, 370/252–254, 338, 392, 401, 395.32, 395.52; 709/224–232
See application file for complete search history.

(56) References Cited
U.S. PATENT DOCUMENTS

| 5,343,465 | A | * | 8/1994 | Khalil | 370/232 |
|---|---|---|---|---|---|
| 5,539,747 | A | * | 7/1996 | Ito et al. | 370/235 |
| 5,712,981 | A | * | 1/1998 | McKee et al. | 709/241 |
| 5,787,253 | A | | 7/1998 | McCreery et al. | |
| 5,872,771 | A | * | 2/1999 | Park et al. | 370/252 |
| 6,085,238 | A | * | 7/2000 | Yuasa et al. | 709/223 |
| 6,405,251 | B1 | | 6/2002 | Bullard et al. | |
| 6,452,915 | B1 | * | 9/2002 | Jorgensen | 370/338 |
| 6,502,131 | B1 | * | 12/2002 | Vaid et al. | 709/224 |
| 6,591,299 | B2 | * | 7/2003 | Riddle et al. | 709/224 |

(Continued)

FOREIGN PATENT DOCUMENTS

KR 2002-0039100 5/2002

*Primary Examiner*—Edan Orgad
*Assistant Examiner*—Venkatesh Haliyur
(74) *Attorney, Agent, or Firm*—Blakely, Sokoloff, Taylor & Zafman LLP

(57) ABSTRACT

A traffic measurement system and a traffic analysis method are provided. The traffic measurement system includes a plurality of measurement devices that collect all of packets flowing through Internet links, extract traffic data required to analyze traffic from the collected packets, and process the extracted data into predetermined flow types, and an analysis server that identifies applications of traffic by analyzing the traffic data transferred from the plurality of measurement devices as a whole, classifies the identified applications into predetermined traffic types, and outputs the classification result. The traffic measurement system measures the traffics in the Internet network and processes the measured traffics to generate detailed traffic statistical data according to applications. In particular, the traffics are analyzed considering measurement data from various points, and the data for identifying the applications are extracted from headers of the applications included in payloads of IP packets in real time. Accordingly, detailed traffic analysis result is provided.

14 Claims, 3 Drawing Sheets

U.S. PATENT DOCUMENTS

| | | | |
|---|---|---|---|
| 6,598,034 B1* | 7/2003 | Kloth | 706/47 |
| 6,665,725 B1* | 12/2003 | Dietz et al. | 709/230 |
| 6,675,209 B1* | 1/2004 | Britt | 709/224 |
| 6,757,257 B1* | 6/2004 | Liu | 370/253 |
| 6,807,156 B1* | 10/2004 | Veres et al. | 370/252 |
| 6,816,903 B1* | 11/2004 | Rakoshitz et al. | 709/226 |
| 6,842,463 B1* | 1/2005 | Drwiega et al. | 370/468 |
| 6,882,930 B2* | 4/2005 | Trayford et al. | 701/117 |
| 6,894,972 B1* | 5/2005 | Phaal | 370/229 |
| 6,978,223 B2* | 12/2005 | Milliken | 702/182 |
| 7,062,264 B2* | 6/2006 | Ko et al. | 455/423 |
| 7,245,587 B2* | 7/2007 | Phaal | 370/244 |
| 7,296,288 B1* | 11/2007 | Hill et al. | 726/2 |
| 7,313,141 B2* | 12/2007 | Kan et al. | 370/394 |
| 2002/0031462 A1* | 3/2002 | Jorgensen | 422/307 |
| 2002/0035698 A1* | 3/2002 | Malan et al. | 713/201 |
| 2002/0114280 A1* | 8/2002 | Yi et al. | 370/235 |
| 2002/0131369 A1* | 9/2002 | Hasegawa et al. | 370/241 |
| 2003/0039212 A1* | 2/2003 | Lloyd et al. | 370/235 |
| 2003/0086425 A1* | 5/2003 | Bearden et al. | 370/392 |
| 2003/0091165 A1* | 5/2003 | Bearden et al. | 379/88.08 |
| 2003/0097438 A1* | 5/2003 | Bearden et al. | 709/224 |
| 2003/0134648 A1* | 7/2003 | Reed et al. | 455/456 |
| 2003/0214913 A1* | 11/2003 | Kan et al. | 370/252 |
| 2004/0073655 A1* | 4/2004 | Kan et al. | 709/224 |

* cited by examiner

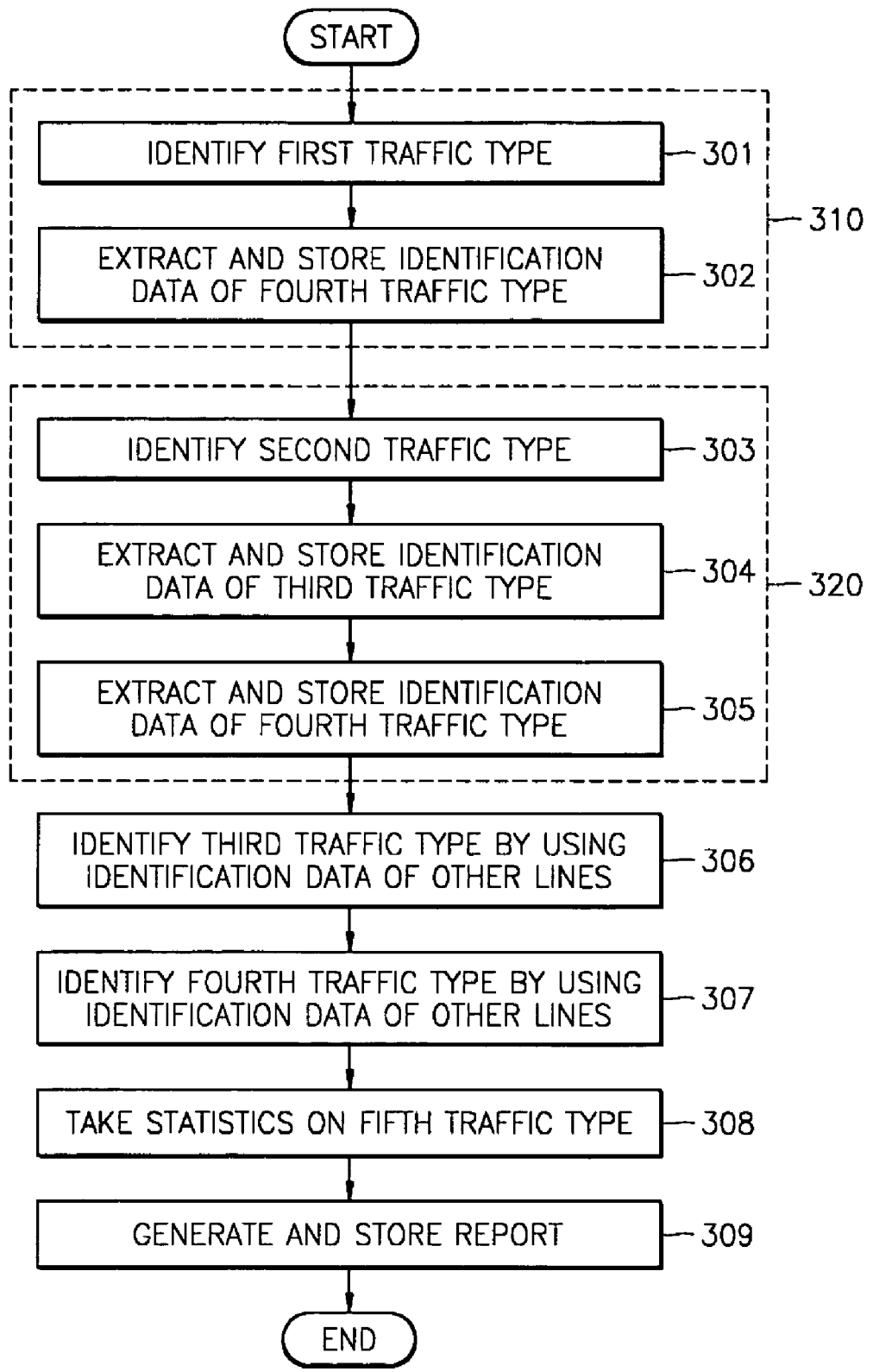

TRAFFIC MEASUREMENT SYSTEM AND TRAFFIC ANALYSIS METHOD THEREOF

BACKGROUND OF THE INVENTION

This application claims the priority of Korean Patent Application No. 2002-79733, filed on Dec. 13, 2002, in the Korean Intellectual Property Office, which is incorporated herein in its entirety by reference.

1. Field of the Invention

The present invention relates to an Internet network measurement system, and more particularly, to a traffic measurement system and a traffic analysis method thereof to collect traffic data from various points of Internet links and analyze the traffic data for each application.

2. Description of the Related Art

Since the network structure and the traffic characteristics of the Internet are complicated, various methods of measuring the Internet network have been proposed and applied. The measurement of traffic is directly related to the design and the plan of a network at an initial stage, traffic engineering at an operation stage, and the provision of high-quality Internet service. In addition, the measurement of the traffic should be performed in network-related operations.

The measurement method of network performance can be divided into an active measurement method and a passive measurement method. The active measurement method analyzes the performance of a network by loading test packets to a network and then measuring characteristics, such as delay and loss, of the test packets, after the test packets pass through the network. The passive measurement method captures packets that pass through a network without affecting the flow of the packets and analyzes various traffic characteristics based on the captured data.

Measurement of traffic volume has been performed by measuring the used rate of each link on the basis of management information base (MIB) data in devices. Such a method can be easily used due to improved performance and standardization of equipment; however, the method is designed to figure out only the volume of traffic that occupies the links. Thus, it is impossible to analyze the structure and the characteristics of the traffic with the method. Routers have traffic classification functions using port numbers to solve the problem; however, the traffic characteristics of the Internet having various applications cannot be obtained according to the traffic classification by port number.

At present, in order to analyze traffic in detail, a method of collecting packets from the links or collecting traffic data using a netflow function by Cisco Systems, Inc., and then analyzing the collected packets or the collected traffic data is commonly used. Such a method is mainly used for research purpose or to temporarily analyze traffic. However, the method should maintain the packet data for the post analysis payload data of the packets that might be related to user information cannot be collected. Thus, data related to applications is lost, and the analysis is performed based on IP/TCP/UDP header data only. In this case, since only port numbers are used to classify the applications, it is difficult to identify the applications that use the ports by other than a conventional method, such as P2P or streaming services. In addition, since a formal analysis method is not available, many experts are required and a storage device having a large capacity or a high-speed server is required. As a result, traffic cannot be continuously measured and analyzed for a long period of time.

Furthermore, since the traffic path of the Internet is asymmetric, correlated analysis should be performed considering traffic collected from several points in a case where the network has multiple external connectivity(e.g. multi-homing case). However, a system or a method for such analysis has not been formalized currently.

SUMMARY OF THE INVENTION

The present invention provides a traffic measurement system to provide a detailed traffic analysis result, especially with application recognition breakdown, by measuring traffic at several points and analyzing the measured traffic.

The present invention also provides a traffic analysis method performed in the traffic measurement system according to the present invention.

The present invention further provides a recording medium on which the traffic analysis method according to the present invention is recorded using program codes that can be operated in a computer.

In accordance with an aspect of the present invention, there is provided traffic measurement system comprising: a plurality of measurement devices that collect all of packets flowing through a set of Internet links, extract traffic data required to analyze traffic from the collected packets, and process the extracted data into predetermined flow types; and an analysis server that recognizes applications of traffic by analyzing the traffic data transferred from the plurality of measurement devices as a whole, classifies the recognized applications into predetermined traffic types, and outputs the classification result.

In accordance with another aspect of the present invention, there is provided a traffic analysis method performed in a traffic measurement system that collects packets flowing through a set of Internet links, analyzes traffic, and recognizes the applications of the packets, the method comprising: classifying a first traffic type of which applications are identified using only port numbers included in flow data that is processed into a predetermined type; classifying a second traffic type of which applications are identified by inspecting application headers and operation-related data that are included in payload of the packets, from the flow data remaining after the first traffic type is classified; classifying a third traffic type of which applications are identified by analyzing the flow data remaining after the second traffic type is classified and reverse-directional flow data of the flow that are measured at different points as a whole; classifying a fourth traffic type of which applications are identified by analyzing the flow data remaining after the third traffic type is classified and flow data measured at different points, since port numbers for the applications are not predetermined; and classifying a fifth traffic type whose applications cannot be identified using the flow data remaining after all of the above traffic type is classified.

BRIEF DESCRIPTION OF THE DRAWINGS

The above aspects and advantages of the present invention will become more apparent by describing in detail exemplary embodiment thereof with reference to the attached drawings in which:

FIG. 3 is a flowchart illustrating a traffic measurement and analysis method performed in an analysis server of FIG. 1.

DETAILED DESCRIPTION OF THE INVENTION

The present invention will now be described more fully with reference to the accompanying drawings, in which a preferred embodiment of the invention is shown.

Figure 1:
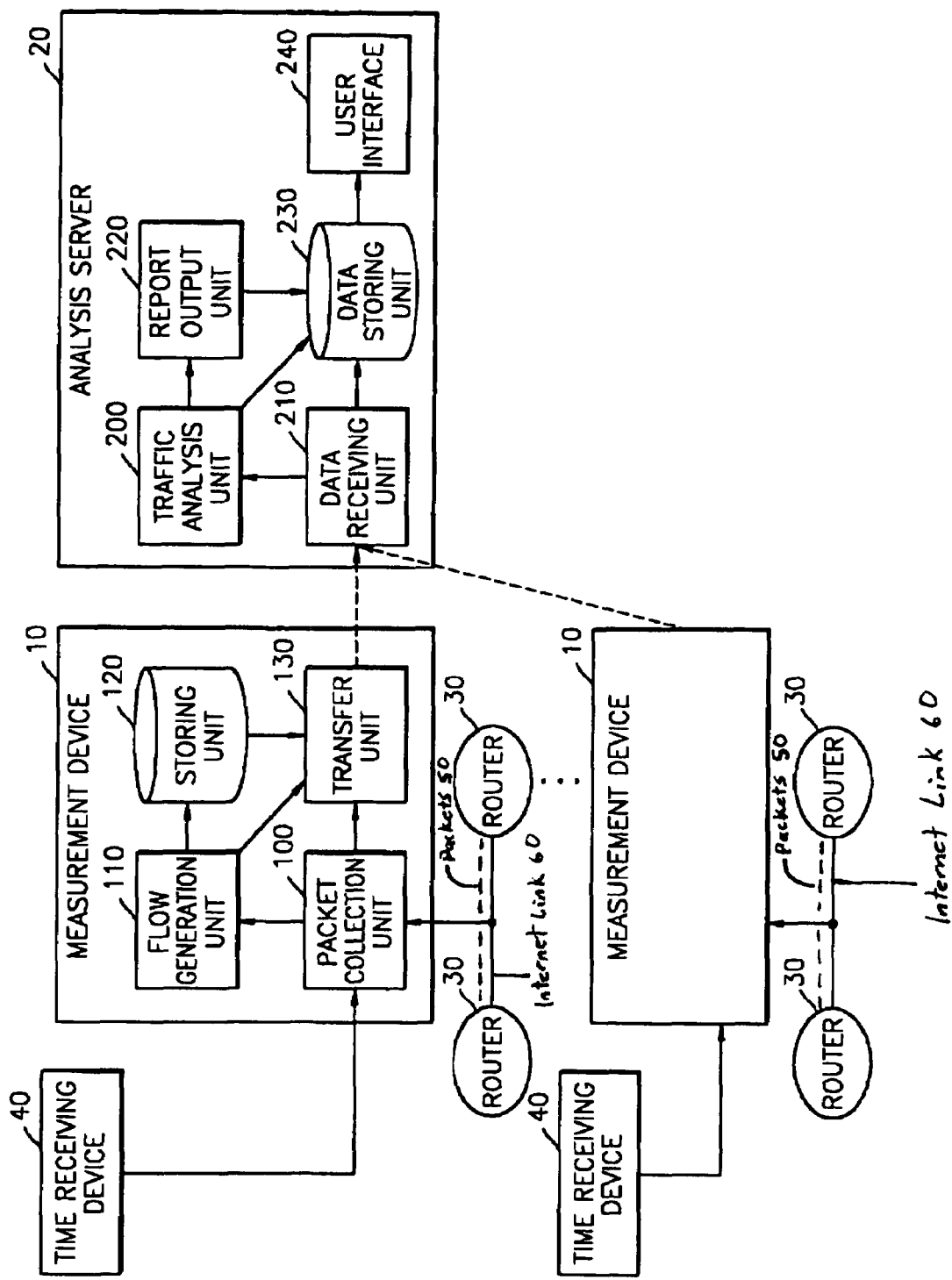
FIG. 1 is a block diagram illustrating a traffic measurement system according to an embodiment of the present invention.

FIG. 1 is a block diagram illustrating a traffic measurement system according to an embodiment of the present invention. A traffic measurement system according to the present invention includes measurement devices 10, an analysis server 20, and time receiving devices 40. In FIG. 1, routers 30 are illustrated for the convenience of description.

Referring to FIG. 1, each of the time receiving devices 40 receives time signals from a GPS satellite or a CDMA base station to synchronize the measurement devices 10.

The measurement devices 10 collect all of the packets that flow through the Internet links and extract and process data that are necessary to analyze traffic, from the collected packets. Thereafter, the measurement devices 10 provide the processed data to the analysis server 20. It is preferable that each of the measurement devices 10 includes a packet collection unit 100, a flow generation unit 110, a storing unit 120, and a transfer unit 130.

The packet collection unit 100 collects all of the packets 50 that flow through the Internet links 60 via the directly connected links between routers via tapping, port mirroring, or signal distribution. Then, the packet collection unit 100 records precise times that are transferred from the time receiving device 40 for each of the packets and provides the packets to the flow generation unit 110.

The flow generation unit 110 generates a flow record by using the packets having the same source and destination addresses, the same protocol number, and the same port number that are collected by the packet collection unit 100. In addition, the flow generation unit 110 analyzes the contents of the packets to extract data required to analyze applications in detail, i.e., operation-related data for determining applications from the payloads of the packets, and the extracted data are temporarily stored in the storing unit 120.

The transfer unit 130 transfers the data stored in the storing unit 120 to the analysis server 20 according to a predetermined time interval.

Thereafter, the analysis server 20 analyzes the data transferred from the measurement devices 10 as a whole to classify traffic according to each application. In addition, the analysis server 20 takes statistics on traffic of the applications to generate traffic reports for the lines. It is preferable that the analysis server 20 includes a traffic analysis unit 200, a data receiving unit 210, a report output unit 220, a data storing unit 230, and a user interface 240.

The data receiving unit 210 receives data from the measurement devices 10 and provides the data to the traffic analysis unit 200.

The traffic analysis unit 200 analyzes the data provided from the data receiving unit 210 and stores the analysis result in the data storing unit 230 or provides the analysis result to the report output unit 220.

The report output unit 220 processes the analysis result received from the traffic analysis unit 200 into a predetermined report type and stores the analysis result in the data storing unit 230.

The user interface 240 displays the report and the analysis result stored in the data storing unit 230 in accordance with a means desired by a user.

Figure 2:
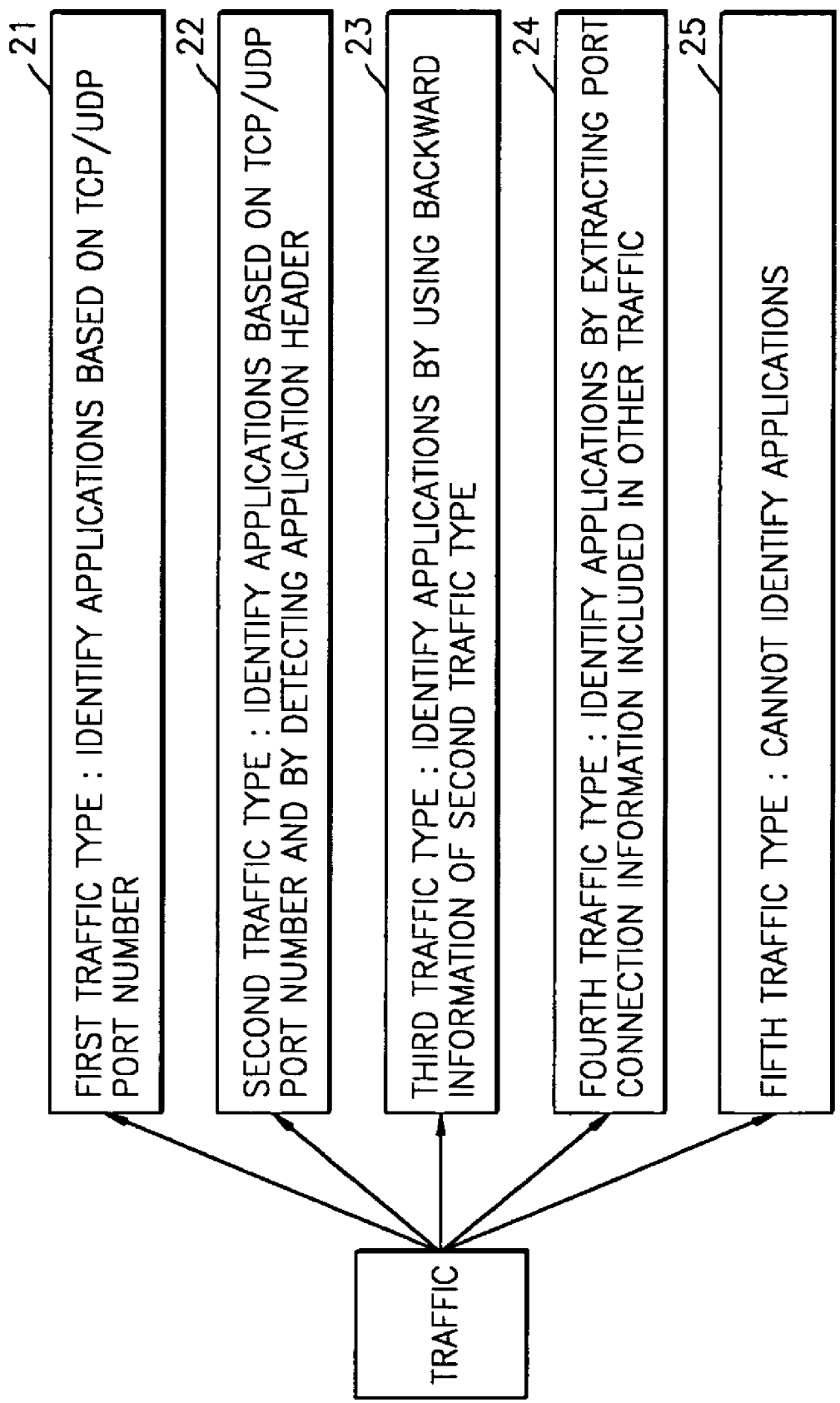
FIG. 2 is a block diagram illustrating an example of traffic classification types used to analyze traffic in a traffic analysis unit of FIG. 1.

FIG. 2 is a block diagram illustrating an example of traffic classification types used to analyze traffic in the traffic analysis unit 200 of FIG. 1.

Referring to FIG. 2, traffic is classified into five types in the present invention. More specifically, examples of traffic classification types according to the present invention include a first traffic type 21, which is classified using TCP/UDP port numbers, a second traffic type 22, which is classified by collecting application headers and data included in the payload of the packets, a third traffic type 23, which is classified by extracting data from the second traffic type 22 since application data is absent in reverse-directional traffic of the second traffic type 22, a fourth traffic type 24, which is classified based on internal data of other flows of traffic since port numbers to be used are exchanged through other flows of traffic, and a fifth traffic type 25, which includes the traffic not classified into the first through fourth traffic types 21 through 24.

Referring to FIG. 2, the first traffic type 21 can be applied to a case where each of the port numbers used in TCP/UDP is assigned to only one application. The classification method of the first traffic type 21 is the simplest and has been traditionally used to classify traffic. Since some applications that use the Internet correspond to the first traffic type 21, the first traffic type 21 is defined as a traffic classification type.

The second traffic type 22 can be applied to a case where a plurality of applications share one port number. The traffic classified into the second traffic type 22 cannot be identified using only the port number but can be identified using the application header or application signature related to the applications, along with IP/TCP/UDP headers. Particularly, for some applications utilizing registered port numbers close to 1024, high probability of confusion exists between an ephemerally allocated client-side port and an actual service port. In other words, the applications of which port numbers larger than 1024 are assigned may share the port numbers with other applications. Thus, traffic should be classified using the application header or application signature related to the applications, along with the IP/TCP/UDP headers.

The third traffic type 23 can be applied to a case where the port numbers corresponding to the second traffic type 22 are used but the application headers or application signature for identifying the port numbers are not included in the corresponding flow. Thus, in order to analyze traffic corresponding to the third traffic type 23, data for identifying the applications should be extracted from traffic of the second traffic type 22 that correspond to the reverse-direction traffic of the third traffic type 23. In particular, since the traffic path of the Internet is asymmetric, forward flows and reverse flows may not be present in the same link. Thus, in order to increase the possibility of identifying the third traffic type 23, it is preferable that the measurement results from the different measurement devices 10 are analyzed together.

The fourth traffic type 24 commonly appears in streaming service applications. In addition, the fourth traffic type 24 uses more than two TCP or UDP connections for the services between a client and a server. For example, a music broadcasting service may include a process of selecting music and a process of receiving the selected music. Here, the first connection is used for connecting to a music broadcasting server for music selection. Accordingly, such traffic is classified into the first traffic type 21, the second traffic type 22, or the third traffic type 23. The second connection to the music broadcasting server is used for receiving the selected music. In addition, the second connection is performed after exchanging the port number to be used between the client and the server, through the first connection, i.e., the control connection. Traffic of the second connection is classified into the fourth traffic type 24. Here, traffic corresponding to the fourth traffic type 24 does not have a predetermined port number.

Thus, traffic can be identified by detecting traffic used in the control connection and extracting the port number used in the control connection.

The fifth traffic type 25 includes the traffic not identified by any of the above-described four types 21 through 24. In addition, traffic of the fifth type 25 is not analyzed in detail, in the present invention. Traffic of the fifth traffic type 25 is generated by the users who use optional port numbers implicitly or applications that are not widely known. Furthermore, traffic of the fifth type 25 occupies relatively small portion of the total internet traffic volume, and thus it is difficult to identify the applications of the fifth traffic type 25.

Traffic analysis can be efficiently performed by classifying traffic into the five types and analyzing traffic classified in their respective types.

FIG. 3 is a flowchart illustrating the traffic measurement and analysis method performed in the analysis server of FIG. 1.

Referring to FIGS. 1 through 3, the analysis server 20 identifies the traffic types of traffic and takes statistics on the traffic types by using the flow records transferred from the measurement devices 10. Here, traffic is classified according to the traffic types of FIG. 2 to identify the applications.

First, the analysis server 20 identifies the applications corresponding to the first traffic type 21 in step 301. Here, the application corresponding to the first traffic type 21 can be identified using only the port numbers. The analysis server 20 determines whether the application signature of the fourth traffic type 24 is included in the first traffic type 21. If the application signature of the fourth traffic type 24 is present, the analysis server 20 extracts the data and stores the data in the data storing unit 230, in step 302. As described above with reference to FIG. 2, for the fourth traffic type 24, the port numbers should be extracted by detecting traffic on the control connection. That is, if traffic for the control connection is identified in step 301, traffic includes the application signature of the fourth traffic type 24. Accordingly, the application signature should be extracted and stored so that the application signature can be used to identify the fourth traffic type 24.

After step 302, the analysis server 20 identifies the second traffic type 22 from the flow data that remains after identifying the first traffic type 21, in step 303. In addition, while identifying the second traffic type 23, if the flow corresponds to the reverse-direction flow of the third traffic type 23, the analysis server 20 extracts the application signature of the third traffic type 23 from the flow and stores the extracted application signature. Furthermore, when the application signature of the fourth traffic type 24 is present, the analysis server 20 extracts and stores the application signature in step 305, as in the case of step 302.

As described previously, since the traffic path of the Internet is asymmetric, the reverse direction flow of a flow may be present in another link. Accordingly, in order to analyze the presence of the reverse direction flow, the data measured at various points should be analyzed and correlated as a whole. Thus, traffic of the third and the fourth traffic types 23 and 24 that are identified in steps 302, 303, and 305 are analyzed considering traffic generated in other links. Traffic of the third traffic type 23 can be represented as the reverse direction traffic of the second traffic type 22. Accordingly, the applications of the third traffic type 23 are analyzed using the application signature of the third traffic type 23 obtained from other links as well as the application signature of the third traffic type 23 generated in one link, in step 306.

After step 306, the applications of the fourth traffic type 24 are analyzed considering the application signature in other links, in step 307.

Traffic not corresponding to the first through fourth traffic types 21 through 24 are classified into the fifth traffic type 25, and the statistics on traffic classified into the fifth traffic type 25 are taken to monitor new applications, and the statistics result is stored, in step 308. Here, the statistics on traffic of the fifth traffic type 25 are taken to classify traffic, which frequently appear, into a new traffic type or into the first through fourth traffic types 21 through 24.

After step 308, the classified traffic types are processed into various report types and stored in the data storing unit 230, in step 309. Thereafter, the stored data is provided to the user via the user interface 240, when requested by the user.

The present invention can be realized as a code on a recording medium which can be read by a computer. Here, the recording medium includes any kind of recording devices in which data are recorded, such as ROM, RAM, CD-ROM, a magnetic tape, a floppy disk, and an optical data recording device, In addition, the recording media read by a computer are distributed to computer systems, connected by a network, to record and execute codes, which can be read by a computer, in a distribution manner.

As described above, the traffic measurement system and the traffic analysis method thereof measure traffic in the Internet network and generate detailed traffic statistical data of the applications by processing the measured traffic. In particular, traffic is analyzed considering the data measured at various points, and the data for identifying the applications are extracted from the headers of the applications included in the payload of IP packets. Thus, detailed traffic analysis can be performed.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A traffic measurement system comprising:
    a plurality of measurement devices that collect packets flowing through Internet links between routers, extract traffic data required to analyze traffic from the collected packets, and process the extracted data into predetermined flow types; and
    an analysis server that identifies applications of traffic by analyzing the traffic data transferred from measurement devices, classifies the identified applications into predetermined traffic types, and outputs the classification result,
    and the traffic types comprise:
        a first traffic type whose applications are identified using only TCP/UDP port numbers;
        a second traffic type whose application is identified by collecting application headers and application signatures that are included in payloads of the packets;
        a third traffic type whose applications are identified by extracting application data from the second traffic type, since application data is not included in reverse traffic of the second traffic type;
        a forth traffic type whose applications are assigned predetermined port numbers are identified based on application signature of other flows since the port numbers are exchanged through an other control flow; and
        a fifth traffic type whose applications are not classified into the first through the fourth traffic types.

2. The traffic measurement system of claim 1, further comprising a plurality of time receiving devices that extract time signals from a GPS satellite or a CDMA base station to synchronize the times of the plurality of measurement devices.

3. The traffic measurement system of any one of claims 1 and 2, wherein each of the plurality of measurement devices comprises:

a packet collection unit that collects the packets flowing through the Internet lines from router connection lines and records the collection times of the packets;

a flow generation unit that generates flows using the packets having the same data including a target address, a protocol, and a port number, from the packets collected by the packet collection unit, extracts data required for detailed analysis of the applications after analyzing the contents of the packets, and stores the extracted data according to the flow; and a transfer unit that transfers the data stored in the flow generation unit to the analysis server according to a predetermined time interval.

4. The traffic measurement system of claim 3, wherein the packet collection unit collects the packets by using one of tapping, port mirroring, and signal distribution.

5. The traffic measurement system of claim 3, wherein the data required for detailed analysis of the applications are application signatures for identifying the applications in payload of the packets.

6. The traffic measurement system of any one of claims 1 and 2, wherein the analysis server comprises:

a data receiving unit that receives the packet data from the plurality of measurement devices;

a traffic analysis unit that analyzes the data provided from the plurality of measurement devices via the data receiving unit as a whole, and classifies the applications into the traffic types according to the analysis result;

a data storing unit that stores the traffic analysis result of the traffic analysis unit; and a user interface that displays the traffic analysis result stored in the data storing unit to a user after processing the traffic analysis result into various types desired by the user.

7. The traffic measurement system of claim 6, wherein the analysis server further comprises a report output unit that processes the traffic analysis result from the traffic analysis unit into a predetermined report type and stores the processed data in the data storing unit, and the report is displayed to the user through the user interface.

8. A traffic analysis method performed in a traffic measurement system that collects packets flowing through Internet links between routers, analyzes traffic, and identifies the applications of the packets, the method comprising:

classifying a first traffic type whose applications are identified using only port numbers included in flow data that is processed into a predetermined type;

classifying a second traffic type whose applications are identified by collecting application headers and application signature that are included in payload of the packets, from the flow data remaining after the first traffic type is classified;

classifying a third traffic type whose applications are identified by analyzing the flow data remaining after the second traffic type is classified and reverse-direction flow data of the flow that are measured at different points as a whole, wherein the third traffic type is identified based on an application signature from other flows since the port numbers are exchanged through other control flows;

classifying a fourth traffic type whose applications are identified by analyzing the flow data remaining after the third traffic type is classified and flow data measured at different points, since port numbers for the applications are not predetermined;

classifying a fifth traffic type whose applications cannot be identified using the flow data remaining after the fourth traffic type is classified; and taking statistics on traffic classified into the fifth traffic type in order to monitor the applications and storing the statistics result, after classifying the fifth traffic type.

9. The traffic analysis method of claim 8, wherein the flow data is packets having the same target address, the same protocol, and the same port number among the packets flowing through the Internet lines.

10. The traffic analysis method of claim 8, further comprising determining whether identification data of the fourth traffic type is present in traffic included classified into the first traffic type and extracting and storing the application signature of the fourth traffic type, after classifying the first traffic type.

11. The traffic analysis method of claim 8, further comprising extracting and storing the application signature of traffic classified into the third traffic type when traffic classified into the second traffic type is backward traffic of traffic classified into the third traffic type, after classifying the second traffic type.

12. The traffic analysis method of claim 8, further comprising determining whether identification data of the fourth traffic type is present in traffic classified into the second traffic type and extracting and storing the application signature of the fourth traffic type, after classifying the second traffic type.

13. The traffic analysis method of claim 8, further comprising processing the classified traffic types into predetermined report types desired by a user and storing or providing the processed report through a user interface, after classifying the fifth traffic type.

14. The traffic measurement system of claim 1, wherein the analysis server receives the traffic data from the plurality of measurement devices as a whole.

* * * * *